(12) United States Patent
Mizutani (10) Patent No.: US 10,375,250 B2
(45) Date of Patent: Aug. 6, 2019

(54) GATE WAY DEVICE, COMMUNICATION SYSTEM, COMMUNICATION METHOD, AND COMMUNICATION PROGRAM

(71) Applicant: NEC Platforms, Ltd., Kawasaki-shi, Kanagawa (JP)

(72) Inventor: Makoto Mizutani, Kawasaki (JP)

(73) Assignee: NEC PLATFORMS, LTD., Kanagawa (JP)

( * ) Notice: Subject to any disclaimer, the term of this patent is extended or adjusted under 35 U.S.C. 154(b) by 0 days.

(21) Appl. No.: 15/833,021

(22) Filed: Dec. 6, 2017

(65) Prior Publication Data

US 2018/0109684 A1    Apr. 19, 2018

Related U.S. Application Data

(63) Continuation of application No. 14/787,301, filed as application No. PCT/JP2015/068492 on Jun. 26, 2015, now abandoned.

(30) Foreign Application Priority Data

Jun. 30, 2014   (JP) ................................. 2014-133603

(51) Int. Cl.
    *H04M 7/12*      (2006.01)
    *H04L 12/28*     (2006.01)
    *H04L 29/12*     (2006.01)

(52) U.S. Cl.
    CPC ............ *H04M 7/125* (2013.01); *H04L 12/28* (2013.01); *H04L 61/2061* (2013.01); *H04L 61/6022* (2013.01)

(58) Field of Classification Search
    None
    See application file for complete search history.

(56) References Cited

U.S. PATENT DOCUMENTS

2002/0085569 A1    7/2002   Inoue
2002/0152323 A1   10/2002   Ono et al.
(Continued)

FOREIGN PATENT DOCUMENTS

CN    1412983 A    4/2003
CN    2907099 Y    5/2007
(Continued)

OTHER PUBLICATIONS

International Search Report for PCT Application No. PCT/JP2015/068492, dated Jul. 21, 2015.
(Continued)

*Primary Examiner* — Jeffrey M Rutkowski
*Assistant Examiner* — Andre Tacdiran (57) ABSTRACT

A gateway device including: a plurality of control units configured to respectively notify first data received from the plurality of communication devices or/and second communication networks and notify the plurality of communication devices or/and second communication networks of second data; and a data analysis and management unit configured to analyze data received from the first communication network and notify a control unit included in the plurality of control units of a result of the analysis, the control unit being related to result of the analysis, and analyze the first data received from the plurality of control units respectively and notify the first communication network, the data analysis and management unit generating a plurality of local MAC addresses from a MAC address given to the gateway device and assigning the local MAC addresses to the plurality of control units.

12 Claims, 4 Drawing Sheets

(56) References Cited

U.S. PATENT DOCUMENTS

| | | |
|---|---|---|
| 2003/0072330 A1 | 4/2003 | Yang et al. |
| 2004/0215752 A1 | 10/2004 | Satapati et al. |
| 2006/0187904 A1 | 8/2006 | Oouchi |
| 2006/0245568 A1* | 11/2006 | Son ............... H04M 7/125 379/211.01 |
| 2008/0008192 A1 | 1/2008 | Matoba |
| 2010/0110975 A1* | 5/2010 | Cagenius ........ H04L 29/12584 370/328 |
| 2012/0163395 A1* | 6/2012 | Shukla ............... H04L 12/56 370/409 |
| 2012/0233338 A1* | 9/2012 | Hamachi ............ H04W 12/08 709/227 |
| 2012/0263038 A1 | 10/2012 | Kobayashi et al. |
| 2014/0025821 A1* | 1/2014 | Baphna ............ H04L 61/2061 709/226 |
| 2014/0044130 A1 | 2/2014 | Banavalikar et al. |
| 2015/0081869 A1 | 3/2015 | Wang et al. |
| 2015/0186174 A1* | 7/2015 | Borkmann ........... H04L 45/66 718/1 |

FOREIGN PATENT DOCUMENTS

| | | |
|---|---|---|
| EP | 1113647 A2 | 7/2001 |
| EP | 2161872 A1 | 3/2010 |
| JP | H11-027310 A | 1/1999 |
| JP | 3132426 B | 2/2001 |
| JP | 2006-215802 A | 8/2006 |
| JP | 2007-251291 A | 9/2007 |
| JP | 2008-306681 A | 12/2008 |
| WO | 2013/128513 A1 | 9/2013 |

OTHER PUBLICATIONS

Austrarian Office Action for AU Application No. 2015238882 dated Apr. 11, 2016.

Chinese Office Action for CN Application No. 201580000672.5 dated Sep. 27, 2016 with English Translation.

Extended European Search Report for EP Application No. EP15778177.4 dated Mar. 14, 2017.

\* cited by examiner

FIG.2

REGISTRATION COMMAND
(GATEWAY → PBX)

| 01: REGISTRATION COMMAND |
| GATEWAY CLASSIFICATION |
| ⋮ |
| MAC ADDRESS |
| ⋮ |

REGISTRATION COMPLETION COMMAND
(PBX → GATEWAY)

| 02: REGISTRATION COMPLETION COMMAND |
| GATEWAY CLASSIFICATION |
| ⋮ |
| EN |
| ⋮ |

FIG.3

GLOBAL MAC ADDRESS:00-01-02-03-04-05
LOCAL MAC ADDRESS:02-01-xx-03-04-05
(xx CHANNEL NUMBER)

| CHANNEL NUMBER | CLASSIFICATION | INTERFACE NUMBER | LOCAL MAC ADDRESS | EN | STATE |
|---|---|---|---|---|---|
| 1 | ANALOG TELEPHONE | 1 | 02-01-01-03-04-05 | 000100 | NOT USED |
| 2 | ANALOG TELEPHONE | 2 | 02-01-02-03-04-05 | 000101 | DURING CONVERSATION |
| 3 | DIGITAL TELEPHONE | 1 | 02-01-03-03-04-05 | 010400 | DURING REGISTRATION |
| 4 | ISDN LINE | 1 | 02-01-04-03-04-05 | 010200 | BEFORE REGISTRATION |
| 5 | ISDN LINE | 2 | 02-01-05-03-04-05 | 010201 | BEFORE REGISTRATION |
| 6 | ISDN LINE | 3 | 02-01-06-03-04-05 | 010202 | BEFORE REGISTRATION |
| ... | ... | ... | ... | ... | ... |

GATE WAY DEVICE, COMMUNICATION SYSTEM, COMMUNICATION METHOD, AND COMMUNICATION PROGRAM

CROSS-REFERENCE TO RELATED APPLICATIONS

This application is a continuation application of U.S. patent application Ser. No. 14/787,301 filed on Oct. 27, 2015, which is a National Stage Entry of international application PCT/JP2015/068492 filed on Jun. 26, 2015, which claims priority from Japanese Patent Application 2014-133603 filed on Jun. 30, 2014, the contents of all of which are incorporated herein by reference, in their entirety.

TECHNICAL FIELD

The present invention relates to a gateway device, a communication system, a communication method, and a communication program. In particular, the present invention relates to a gateway device obtained by unifying a plurality of gateway devices and a communication method thereof, a communication system including a gateway device, and a communication program for gateway device.

BACKGROUND ART

In gateway devices of IP base for telephone set system, there are various kinds, such as an analog telephone set, a digital multifunction telephone set, an analog line, an ISDN line, and an IP line. They are separate devices. In a case where a plurality of gateway devices is installed, it is necessary to give addresses to respective devices, resulting in complicatedness in management and maintenance. Furthermore, it is necessary to secure a space and a power supply for installing a plurality of devices. In addition, in a case where a power failure countermeasure is taken, it becomes necessary to take a countermeasure for respective devices.

The IP-based gateway device communicates with a private branch exchange (hereafter referred to as PBX), which manages gateway devices and controls calls, by TCP or UDP packet communication. Commands given and taken between the PBX and the gateway device are included in packets. In addition, an MAC address and a device number (hereafter referred to as EN (Equipment Number)) are included in the commands to specify a device.

For using the gateway device, it is necessary to conduct registration into the PBX. It is necessary to specify a device in the PBX. Therefore, the gateway device transmits a command for registration including a MAC (Media Access Control) address to the PBX. If the PBX can specify the device, the PBX notifies the gateway device of the EN. On and after the registration, a call control is exercised with the EN included in the command.

As for a technique relating to the present invention, there is a description of a high-speed LAN switching control method (abstract and claim 1) in PTL 1. A LAN switch has a management table stating a local MAC address, a global MAC address, and a connection port. A local MAC address corresponding to a global MAC address is assigned to each terminal. The local MAC address is formed by compressing the global MAC address to the number of bits that can be given to a maximum number of terminals in a system to make them distinguishable. If a packet directed to a local MAC address is input, exchange connection to a corresponding stored connection port is conducted. The packet is transferred to a corresponding global MAC address.

In a communication system described in PTL 2, a single station side communication device connected to a network to which a plurality of multicast delivery servers are connected and one or more subscriber termination devices accommodating terminal devices are connected via an optical transmission medium. In PTL 2, there is a statement that a global IP address is rewritten to a local IP address on the basis of the global IP address and a source IP address in a multicast frame delivered by a multicast delivery server, in the communication system (abstract and claim 1). In PTL 2, there is a statement that a destination MAC address in a multicast frame is rewritten to a MAC address generated in relation to the local IP address (claim 2).

CITATION LIST

Patent Literature

{PTL 1} JP-B1-3132426
{PTL 2} JP-A-2008-306681

SUMMARY OF INVENTION

Technical Problem

The present applicant studied a gateway device obtained by unifying a plurality of gateway devices considering aspects of management and maintenance, a secured space and a power supply for installing a plurality of devices, and a power failure countermeasure.

However, since the MAC address is unique to each device, if the MAC address becomes one by unifying a plurality of gateway devices, there will be a problem that it becomes impossible to conduct registration corresponding to a plurality of devices.

Solution to Problem

According to a first aspect of the present invention, there is provided a gateway device that relays between a first communication network and a plurality of communication devices or/and second communication networks, the gateway device comprising:

a plurality of control units configured to respectively notify first data received from the plurality of communication devices or/and second communication networks and notify the plurality of communication devices or/and second communication networks of second data; and a data analysis and management unit configured to analyze data received from the first communication network and notify a control unit included in the plurality of control units of a result of the analysis, the control unit being related to result of the analysis, and analyze the first data received from the plurality of control units respectively and notify the first communication network, the data analysis and management unit generating a plurality of local MAC addresses from a MAC address given to the gateway device and assigning the local MAC addresses to the plurality of control units.

According to a second aspect of the present invention, there is provided a communication method in a gateway device that relays between a first communication network and a plurality of communication devices or/and second communication networks, the communication method comprising:

causing a plurality of control units to respectively notify first data received from the plurality of communication devices or/and second communication networks and notify the plurality of communication devices or/and second communication networks of second data;

causing a data analysis and management unit to analyze data received from the first communication network and notify a control unit included in the plurality of control units of a result of the analysis, the control unit being related to result of the analysis, analyze the first data received from the plurality of control units respectively and notify the first communication network, and generate a plurality of local MAC addresses from a MAC address given to the gateway device and assign the local MAC addresses to the plurality of control units.

According to a third aspect of the present invention, there is provided a program causing a computer as a gateway device that relays between a first communication network and a plurality of communication devices or/and second communication networks to function as:

a plurality of control units configured to respectively notify first data received from the plurality of communication devices or/and second communication networks and notify the plurality of communication devices or/and second communication networks of second data; and a data analysis and management unit configured to analyze data received from the first communication network and notify a control unit included in the plurality of control units of a result of the analysis, the control unit being related to result of the analysis, and analyze the first data received from the plurality of control units respectively and notify the first communication network, generate a plurality of local MAC addresses from a MAC address given to the gateway device and assign the local MAC addresses to the plurality of control units.

Advantageous Effects of the Invention

According to the present invention, it is possible to provide a gateway device obtained by unifying a plurality of gateway devices. The space can be saved by concentrating a plurality of devices to one device. Since the device becomes one, a used IP address also becomes one. As a result, the maintenance property can also be improved.

REFERENCE SINGS LIST

1 PBX
2 IP network
3 Unified gateway device
41 Analog telephone set
42 Digital multifunction telephone set
43 Public analog network
44 Public ISDN network
45 Public IP network
311 IP I/F unit
321 Data transmission/reception unit
331 Data analysis and management unit
341 Analog telephone control unit
351 Digital multifunction telephone control unit
361 Analog line control unit
371 ISDN line control unit
381 IP line control unit
342 Analog telephone I/F unit
352 Digital multifunction telephone I/F unit
362 Analog line I/F unit
372 ISDN line I/F unit
382 IP line I/F unit

DESCRIPTION OF EMBODIMENTS

Hereafter, an embodiment of the present invention will be described in detail with reference to the drawings.

A gateway device in an embodiment described hereafter is a gateway device obtained by unifying a plurality of gateway devices, and is referred to as unified gateway device. The gateway device in the embodiment described hereafter relays between an IP network connected to a PBX, and an analog telephone set 41, a digital multifunction telephone set 42, a public analog network 43, a public ISDN network 44, and a public IP network 45. However, the present invention is not restricted to such an embodiment, but the present invention is applied to a gateway device that relays between a first communication network and a plurality of communication devices or/and second communication networks.

Figure 1:
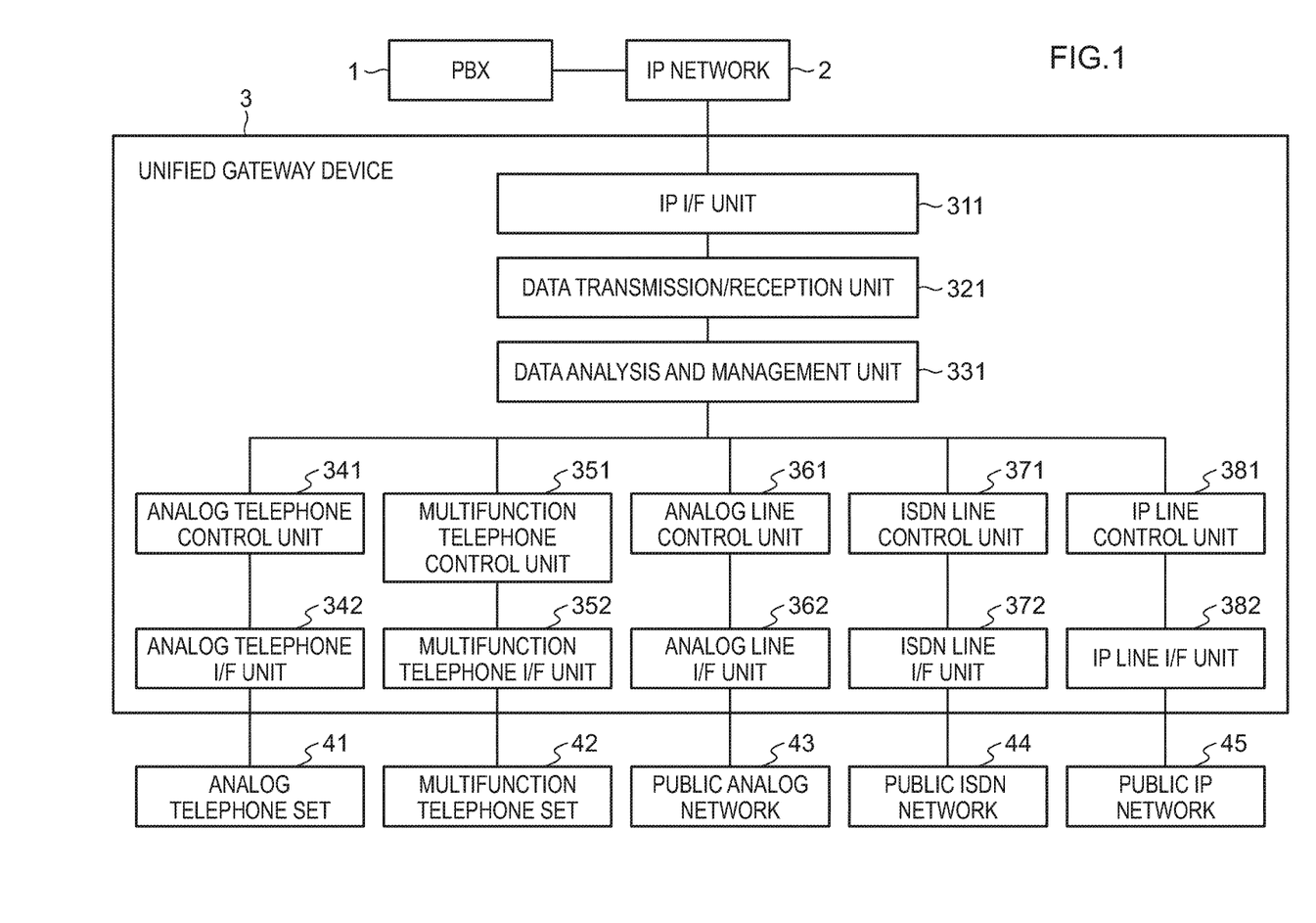
FIG. 1 A figure is a block diagram illustrating a circuit configuration of a unified gateway device according to an embodiment of the present invention.

FIG. 1 is a block diagram illustrating a circuit configuration of a unified gateway device according to an embodiment of the present invention.

A unified gateway device 3 mounts an analog telephone control unit 341, a digital multifunction telephone control unit 351, an analog line control unit 361, an ISDN line control unit 371, and an IP line control unit 381 for every gateway classification. The control units are connected to an analog telephone I/F unit 342, a digital multifunction telephone I/F unit 352, an analog line I/F unit 362, an ISDN line I/F unit 372, and an IP line I/F unit 382, which are interface units of respective control units, respectively. Furthermore, the control units 341 to 381 are connected to a data analysis and management unit 331.

The analog telephone control unit 341 and the analog telephone I/F unit 342, the digital multifunction telephone control unit 351 and the digital multifunction telephone I/F unit 352, the analog line control unit 361 and the analog line I/F unit 362, the ISDN line control unit 371 and the ISDN line I/F unit 372, and the IP line control unit 381 and the IP line I/F unit 382 are component units (hereafter referred to as gateways) in the unified gateway device 3 provided individually for the analog telephone set 41, the digital multifunction telephone set 42, the public analog network 43, the public ISDN network 44, and the public IP network 45, respectively. An IP I/F unit 311, a data transmission/reception unit 321, and a data analysis and management unit 331 become shared units in the unified gateway device 3. Such structure makes a gateway device obtained by unifying a plurality of gateway devices. The analog telephone set 41 and the digital multifunction telephone set 42 become the communication devices, and the public analog network 43, the public ISDN network 44, and the public IP network 45 become the second communication networks.

The IP I/F unit 311 is connected to a private branch exchange (hereafter referred to as PBX) 1 via an IP network 2 (a first communication network).

The data transmission/reception unit 321 conducts data transmission/reception with the PBX 1 via the IP I/F unit 311.

The data analysis and management unit 331 analyzes data received by the data transmission/reception unit 321, and then notifies the control units 341 to 381 of an analysis result. Furthermore, the data analysis and management unit 331 manages the local MAC address and an EN notified of by the PBX 1.

The analog telephone control unit 341 is connected to the analog telephone set 41 via the analog telephone I/F unit 342. The digital multifunction telephone control unit 351 is connected to the digital multifunction telephone set 42 via the digital multifunction telephone I/F unit 352. The analog line control unit 361 is connected to the public analog network 43 via the analog line I/F unit 362. The ISDN line control unit 371 is connected to the public ISDN network 44 via the ISDN line I/F unit 372. The IP line control unit 381 is connected to the public IP network 45 via the IP line I/F unit 382.

Respective control units conduct processing of a command received from the telephone set 41 or 42 or the public network 43 to 45 via respective I/F units connected to the control units and notify the PBX 1 of a command via the data transmission/reception unit 321. Furthermore, the respective control units notify the telephone set 41 or 42, or any of the public networks 43 to 45 of a command from the PBX 1.

Figure 2:
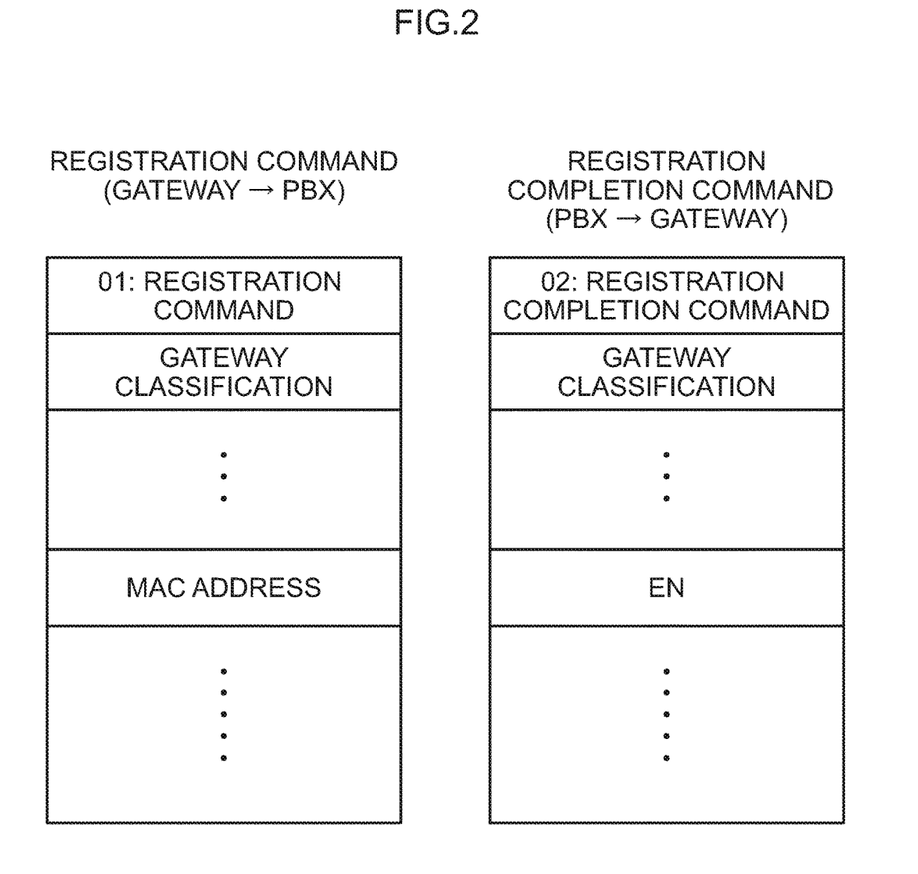
FIG. 2 A figure illustrates an example of a format of a command given and taken between a PBX and a gateway at the time of registration.

FIG. 2 illustrates an example of a format of a command given and taken between the PBX and the unified gateway at the time of registration.

In a registration command of which the unified gateway device 3 notifies the PBX 1, a gateway classification and a MAC address for discriminating a device are included in a field. On the other hand, in a registration completion command of which the PBX 1 notifies the unified gateway device 3, a gateway classification and an EN are included in a field.

Figure 3:
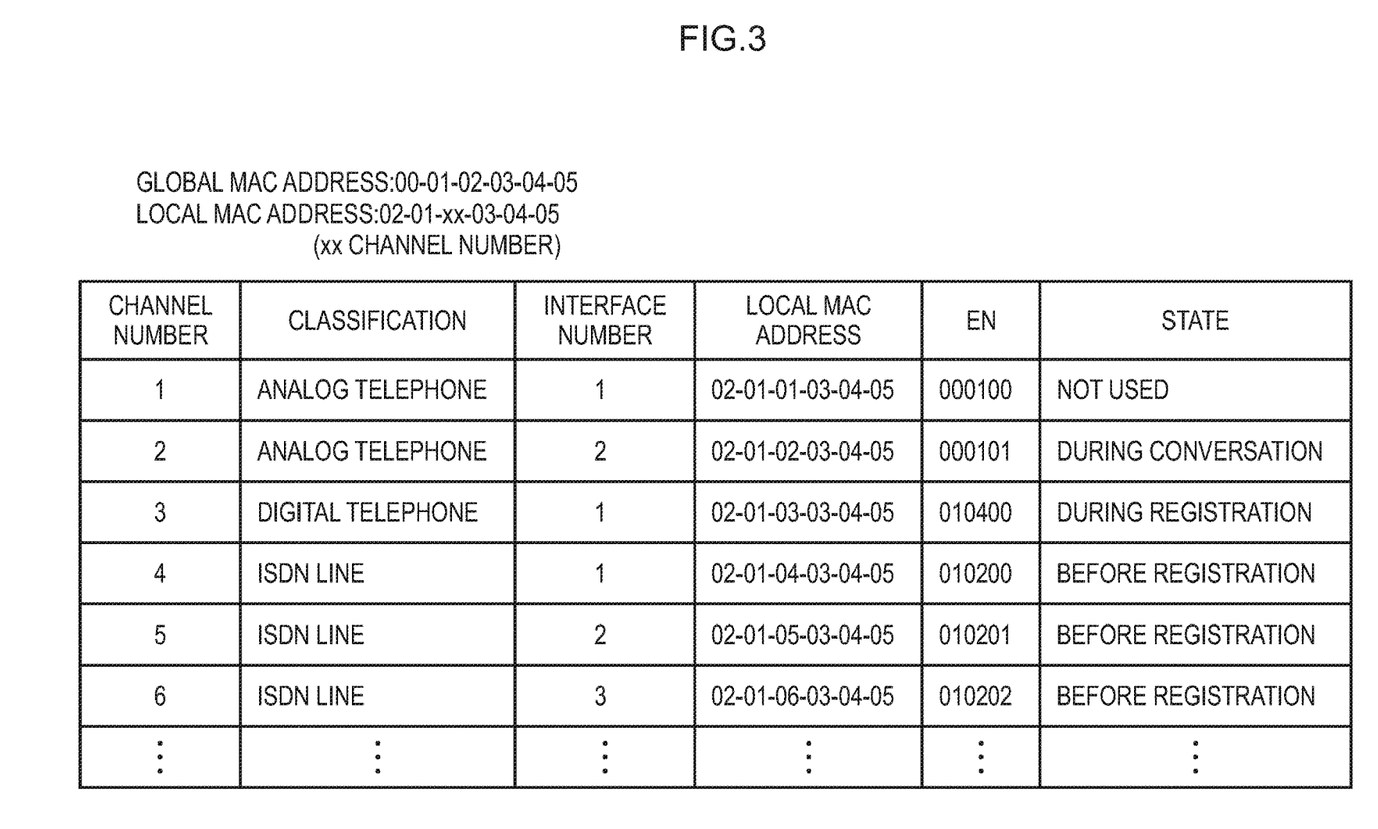
FIG. 3 A figure illustrates a generation rule of a local MAC address generated by a data analysis and management unit illustrated in FIG. 1 and data for management held by the data analysis and management unit.

FIG. 3 illustrates a generation rule of a local MAC address generated by the data analysis and management unit 331 illustrated in FIG. 1 and data for management held by the data analysis and management unit 331.

A local MAC address is generated by regarding a MAC address given to the unified gateway device as a global MAC address and changing a first octet and a third octet of the global MAC address. In the first octet, a second bit representing the local MAC address is turned ON. The third octet becomes a channel number. As a result, a plurality of local MAC addresses is generated for one global MAC address. The local MAC address is assigned to at least the analog telephone control unit 341, the digital multifunction telephone control unit 351, the analog line control unit 361, the ISDN line control unit 371, and the IP line control unit 381. Here, the local MAC address is assigned to the analog telephone control unit 341 and the analog telephone I/F unit 342, the digital multifunction telephone control unit 351 and the digital multifunction telephone I/F unit 352. The local MAC address is also assigned to the analog line control unit 361 and the analog line I/F unit 362, the ISDN line control unit 371 and the ISDN line I/F unit 372, and the IP line control unit 381 and the IP line I/F unit 382. Communication between the unified gateway device 3, and the analog telephone set 41, the digital multifunction telephone set 42, the public analog network 43, the public ISDN network 44, and the public IP network 45 is conducted by using the assigned local MAC address.

The unified gateway device has gateway functions of a plurality of kinds for the analog telephone set 41, the digital multifunction telephone set 42, the public analog network 43, the public ISDN network 44, and the public IP network 45. The data analysis and management unit 331 manages them by taking a channel as the unit, and holds a management table for connecting a gateway classification, an interface number, a local MAC address, and an EN of an individual channel, as data. Furthermore, the data analysis and management unit 331 holds states of respective channels together. In the states, there are, for example, "before registration," "during registration," "not used," and "during conversation."

The management table is generated when the unified gateway device 3 is started. Registration is started one after another after the management table is generated.

The unified gateway device uses the local MAC address in an area of a MAC address in a command for registration transmitted to the PBX. As described above, the local MAC address is generated on the basis of a MAC address specific to the unified gateway device 3 every device (the analog telephone set 41, the digital multifunction telephone set 42, the public analog network 43, the public ISDN network 44, and the public IP network 45). Since gateways of a plurality of kinds are included in the unified gateway device, registration is conducted every gateway. The local MAC address used at that time also becomes a value that is different from gateway to gateway.

The PBX 1 receives the command for registration, and notifies each gateway in the unified gateway device 3 of a command of registration completion. At that time, the PBX 1 notifies each gateway of a specific EN. The data analysis and management unit 331 can specify a gateway on the basis of the EN by having a management table for connecting the EN with a gateway classification therein.

If the registration is completed, call control can be exercised by using an EN of the pertinent gateway. For example, it is supposed that the PBX 1 conducts communication with one of the analog telephone set 41, the digital multifunction telephone set 42, the public analog network 43, the public ISDN network 44, and the public IP network 45, in order to set a call. In this case, the PBX 1 transmits data including the MAC address and EN given to the unified gateway device 3 to the unified gateway device 3. The unified gateway device 3 specifies a local MAC address on the basis of the EN by referring to the management table. The unified gateway device 3 can conduct communication with one of the analog telephone set 41, the digital multifunction telephone set 42, the public analog network 43, the public ISDN network 44, and the public IP network by using the local MAC address.

(Description of Operation)

Figure 4:
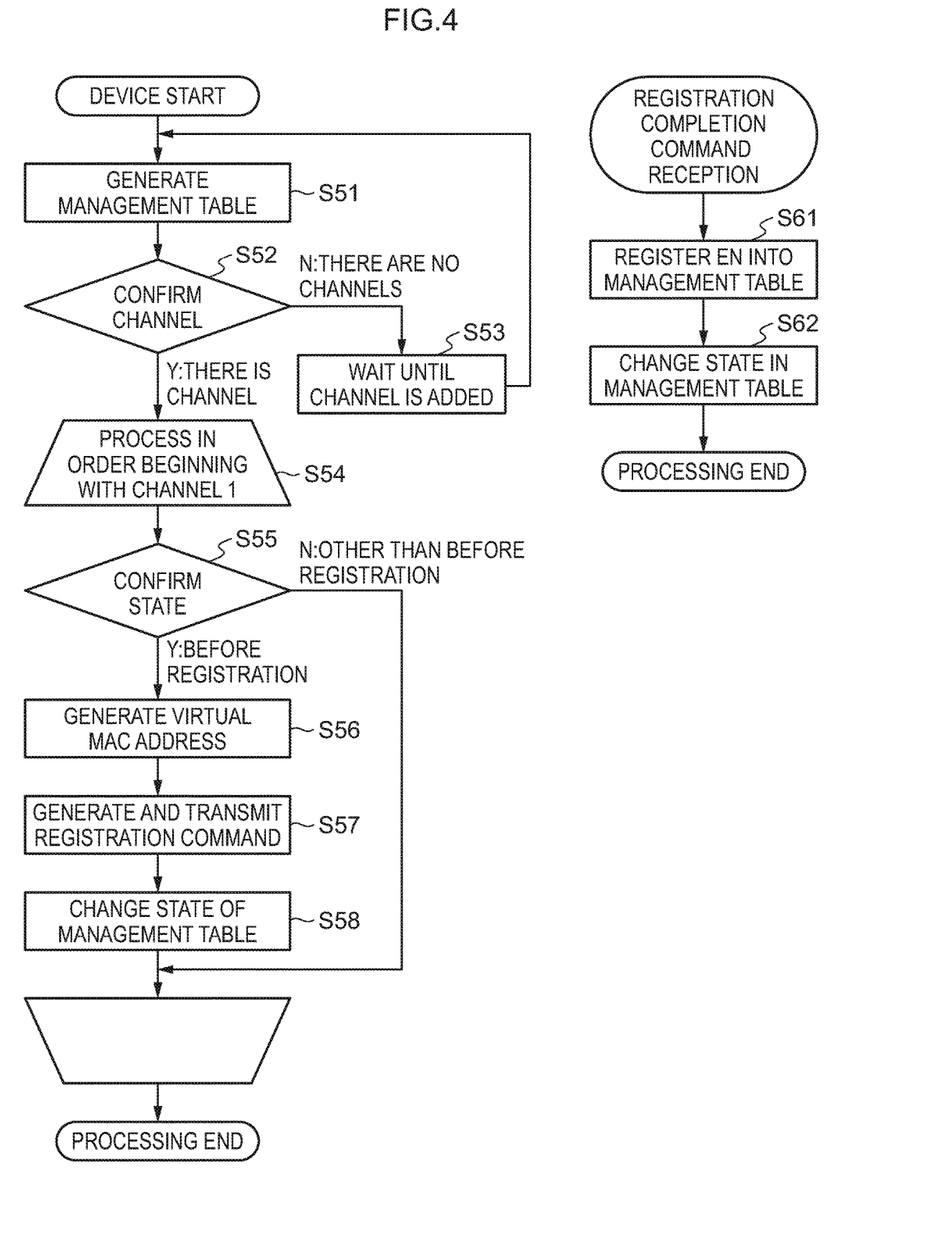
FIG. 4 A figure illustrates how processing is conducted since the start of the unified gateway device until the completion of the registration.

FIG. 4 illustrates how processing is conducted since start of the unified gateway device 3 until the registration is completed.

The unified gateway device 3 is started. The analog telephone I/F unit 342, the multifunction telephone I/F unit 352, the analog line I/F unit 362, the ISDN line I/F unit 372, and the IP line I/F unit 382 notify the data analysis and management unit 331 of the number of channels via the respective control units. The data analysis and management unit 331 generates a management table as illustrated in FIG. 3 (step S51).

The data analysis and management unit 331 confirms a channel in the management table (step S52). In a case where there are no channels (step S52: N), the data analysis and management unit 331 waits until a channel is added (step S53). If a channel is added, the data analysis and management unit 331 returns to the management table generation (step S51). In a case where there is a channel (step S52: Y), the data analysis and management unit 331 starts registration processing in order beginning with channel 1 in the management table (step S54). The data analysis and management unit 331 confirms a state in the management table (step S55). In a case where the state is other than "before registration" (step S55: N), the data analysis and management unit 331 performs registration processing for next channel. In a case where the state is "before registration" (step S55: Y), the data analysis and management unit 331 generates a virtual MAC address (local MAC address), and registers the virtual MAC address (local MAC address) into the management table (step S56). Subsequently, the data analysis and management unit 331 generates a registration command, and transmits the command to the PBX 1 via the data transmission/reception unit 321 (step S57). Upon the transmission, the data analysis and management unit 331 changes the state in the management table to "during registration" (step S58). After executions for all channels are completed, the processing is finished.

If the data transmission/reception unit 321 receives a registration completion command from the PBX 1, the data analysis and management unit 331 is notified thereof. The data analysis and management unit 331 takes out an EN from the received command, and registers the EN into the management table (step S61). Subsequently, the data analysis and management unit 331 changes the state in the management table to "not used" (usable state) (step S62), and the processing is finished.

According to the present embodiment, it is possible to collect a plurality of gateway devices into one device by using a mechanism that generates a plurality of local MAC addresses from one global MAC address as described heretofore. As a result, IP addresses are also collected, and consequently improvement of the maintenance property can be expected. Furthermore, since a plurality of gateway devices are unified, improvement can be expected in aspects such as an installation space and securement of power supplies.

In the present embodiment, it becomes possible to unify gateway devices of a plurality of kinds. However, it also becomes possible to expand ports of gateways of the same kind. As a result, it is possible to obtain a gateway device usable for a user that uses a large number of terminals and lines and that lacks the number of ports in the conventional gateway device.

Heretofore, the embodiment of the present invention has been described. A part or whole of the analog telephone control unit 341, the digital multifunction telephone control unit 351, the analog line control unit 361, the ISDN line control unit 371, the IP line control unit 381, the data analysis and management unit 331, and the data transmission/reception unit 321 may be formed of hardware, or may be formed of software. A function of a part or whole of respective units can also be implemented by a computer that reads a program implementing the function from a computer readable recording medium such as a CD-ROM, a DVD, or a flash memory and executes the program.

For example, a computer functioning as a packet collecting device can be formed of a storage unit storing a program, such as a hard disc or a ROM, a display unit such as a liquid crystal display, a DRAM, which stores data required for computation, a CPU, and a bus, which connects the units. The function of the data analysis and management unit according to the present embodiment can be implemented by describing the operation illustrated in FIG. 4 with a program, storing the program in a storage unit, such as a ROM, storing information required for computation in a DRAM, and causing the program to operate in a CPU.

In addition, the present invention is not restricted to the above-described embodiment. It is a matter of course that various changes are possible without departing from the spirit of the present invention described already.

The present application is based on Japanese Patent Application 2014-133603 (applied on Jun. 30, 2014), and claims priority on Paris Convention based on Japanese Patent Application 2014-133603. Contents disclosed in Japanese Patent Application 2014-133603 are incorporated in the present specification by reference.

The representative embodiment of the present invention has been described in detail. It should be understood that various changes, substitutions, and alternatives can be made without departing from the spirit and scope of the invention defined in claims. Furthermore, even if claims are corrected in application procedures, the present inventor intends that an equivalent scope of the claimed invention is maintained.

The whole or a part of the embodiments described above may be described as the following supplementary notes, but is not limited thereto.

(Supplementary Note 1)

A gateway device that relays between a first communication network and a plurality of communication devices or/and second communication networks, the gateway device comprising:

a plurality of control units configured to respectively notify first data received from the plurality of communication devices or/and second communication networks and notify the plurality of communication devices or/and second communication networks of second data; and a data analysis and management unit configured to analyze data received from the first communication network and notify a control unit included in the plurality of control units of a result of the analysis, the control unit being related to result of the analysis, and analyze the first data received from the plurality of control units respectively and notify the first communication network, the data analysis and management unit generating a plurality of local MAC addresses from a MAC address given to the gateway device and assigning the local MAC addresses to the plurality of control units.

(Supplementary Note 2)

The gateway device according to supplementary note 1, wherein the data analysis and management unit holds a management table connecting an equipment number for identifying the plurality of communication devices or/and second communication networks, the plurality of local MAC addresses, and classifications of the plurality of communication devices or/and second communication networks.

(Supplementary Note 3)

The gateway device according to supplementary note 1 or 2, wherein the communication device is an analog telephone set or/and a digital telephone set, and the second communication network is at least one of a public analog network, a public ISDN network, and public IP network.

(Supplementary Note 4)

A communication system comprising:

the gateway device according to any one of supplementary notes 1 to 3;

a private branch exchange connected to the gateway device via the first communication network; and a plurality of communication devices connected to the gateway device or/and public networks connected via second communication networks connected to the gateway device.

(Supplementary Note 5)

A communication method in a gateway device that relays between a first communication network and a plurality of communication devices or/and second communication networks, the communication method comprising:

causing a plurality of control units to respectively notify first data received from the plurality of communication devices or/and second communication networks and notify the plurality of communication devices or/and second communication networks of second data;

causing a data analysis and management unit to analyze data received from the first communication network and notify a control unit included in the plurality of control units of a result of the analysis, the control unit being related to result of the analysis, analyze the first data received from the plurality of control units respectively and notify the first communication network, and generate a plurality of local MAC addresses from a MAC address given to the gateway device and assign the local MAC addresses to the plurality of control units.

(Supplementary Note 6)

The communication method according to supplementary note 5, wherein the data analysis and management unit is caused to hold a management table connecting an equipment number for identifying the plurality of communication devices or/and second communication networks, the plurality of local MAC addresses, and classifications of the plurality of communication devices or/and second communication networks.

(Supplementary Note 7)

The communication method according to supplementary note 5 or 6, wherein the communication device is an analog telephone set or/and a digital telephone set, and the second communication network is at least one of a public analog network, a public ISDN network, and public IP network.

(Supplementary Note 8)

A program causing a computer as a gateway device that relays between a first communication network and a plurality of communication devices or/and second communication networks to function as:

a plurality of control units configured to respectively notify first data received from the plurality of communication devices or/and second communication networks and notify the plurality of communication devices or/and second communication networks of second data; and a data analysis and management unit configured to analyze data received from the first communication network and notify a control unit included in the plurality of control units of a result of the analysis, the control unit being related to result of the analysis, and analyze the first data received from the plurality of control units respectively and notify the first communication network, generate a plurality of local MAC addresses from a MAC address given to the gateway device and assign the local MAC addresses to the plurality of control units.

(Supplementary Note 9)

The program according to supplementary note 8, wherein the data analysis and management unit holds a management table connecting an equipment number for identifying the plurality of communication devices or/and second communication networks, the plurality of local MAC addresses, and classifications of the plurality of communication devices or/and second communication networks.

(Supplementary Note 10)

The program according to supplementary note 8 or 9, wherein the communication device is an analog telephone set or/and a digital telephone set, and the second communication network is at least one of a public analog network, a public ISDN network, and public IP network.

INDUSTRIAL APPLICABILITY

The present invention is applied to a gateway device that relays between a first communication network and a plurality of communication devices or/and second communication networks. In particular, the present invention is applied suitably to a gateway device that relays between a PBX and a plurality of telephone sets or/and a public network.

The invention claimed is:

1. A gateway device that relays between a first communication network and a plurality of communication devices or/and second communication networks, the gateway device comprising:

a memory storing instructions; and at least one processor configured to process the instructions to implement:

a plurality of control units that correspond to the plurality of communication devices or/and second communication networks;

a data analysis and management unit that corresponds to the first communication network, the plurality of control units being configured to respectively notify the data analysis and management unit of first data received from the plurality of communication devices or/and second communication networks and notify the plurality of communication devices or/and second communication networks of second data received from the data analysis and management unit; and the data analysis and management unit being configured to:

analyze data received from the first communication network and notify a control unit included in the plurality of control units of a first result of the analysis as the second data, the control unit being related to the first result of the analysis, analyze the first data received from the plurality of control units respectively and notify the first communication network of a second result of the analysis, and generate a plurality of local Media Access Control (MAC) addresses from a MAC address given to the gateway device and assign the plurality of local MAC addresses to the plurality of control units respectively, wherein each of plurality of local MAC addresses are generated by:

setting the local MAC address equal to the MAC address of the gateway device; and
subsequent to the setting:
changing a second bit of the local MAC address to a value of one, wherein the second bit indicates that the local MAC address is a local MAC address type when having a value of one, and wherein the second bit is in a first octet in the local MAC address, and
changing a third octet of the local MAC address to a channel number of a respective one of the plurality of control units, and
wherein the data analysis and management unit is further configured to
assign each of the plurality of local MAC addresses to each of the plurality of control units corresponding to the channel number and
control communication between the first communication network and the plurality of communication devices or/and second communication networks based on the plurality of local MAC addresses.

2. The gateway device according to claim 1, wherein the data analysis and management unit is further configured to generate a management table connecting the channel number associated with each of the plurality of control units, an equipment number for identifying the plurality of communication devices or/and second communication networks, the plurality of local MAC addresses, and classifications of the plurality of communication devices or/and second communication networks.

3. The gateway device according to claim 2, wherein the plurality of communication devices includes at least one of an analog telephone set and a digital telephone set, and
the second communication networks include at least one of a public analog network, a public ISDN network, and public IP network.

4. A communication system comprising:
the gateway device according to claim 1;
a private branch exchange connected to the gateway device via the first communication network; and
the plurality of communication devices connected to the gateway device or/and the second communication networks connected to the gateway device.

5. The communication system according to claim 4, wherein the data analysis and management unit is further configured to generate a management table connecting the channel number associated with each of the plurality of control units, an equipment number for identifying the plurality of communication devices or/and second communication networks, the plurality of local MAC addresses, and classifications of the plurality of communication devices or/and second communication networks.

6. The communication system according to claim 5, wherein the plurality of communication devices includes at least one of an analog telephone set and a digital telephone set, and the second communication networks include at least one of a public analog network, a public ISDN network, and public IP network.

7. A communication method in a gateway device that relays between a first communication network and a plurality of communication devices or/and second communication networks, the gateway device comprising:
a memory storing instructions; and
at least one processor configured to process the instructions to implement:
a plurality of control units that correspond to the plurality of communication devices or/and second communication networks;
a data analysis and management unit that corresponds to the first communication network, the communication method comprising:
causing the plurality of control units to respectively
notify the data analysis and management unit of first data received from the plurality of communication devices or/and second communication networks and
notify the plurality of communication devices or/and second communication networks of second data received from the data analysis and management unit; and
causing the data analysis and management unit to
analyze data received from the first communication network and
notify a control unit included in the plurality of control units of a first result of the analysis as the second data, the control unit being related to the first result of the analysis,
analyze the first data received from the plurality of control units respectively and notify the first communication network of a second result of the analysis, and
generate a plurality of local Media Access Control (MAC) addresses from a MAC address given to the gateway device and
assign the plurality of local MAC addresses to the plurality of control units respectively,
wherein each of plurality of local MAC addresses are generated by:
setting the local MAC address equal to the MAC address of the gateway device; and
subsequent to the setting:
changing a second bit of the local MAC address to a value of one, wherein the second bit indicates that the local MAC address is a local MAC address type when having a value of one, and wherein the second bit is in a first octet in the local MAC address, and
changing a third octet of the local MAC address to a channel number of a respective one of the plurality of control units, and
wherein the data analysis and management unit assigns each of the plurality of local MAC addresses to each of the plurality of control units corresponding to the channel number and controls communication between the first communication network and the plurality of communication devices or/and second communication networks based on the plurality of local MAC addresses.

8. The communication method according to claim 7, wherein the communication method further comprises:
causing the data analysis and management unit to generate a management table connecting the channel number associated with each of the plurality of control units, an equipment number for identifying the plurality of communication devices or/and second communication networks, the plurality of local MAC addresses, and classifications of the plurality of communication devices or/and second communication networks.

9. The communication method according to claim 8, wherein the plurality of communication devices includes at least one of an analog telephone set and a digital telephone set, and the second communication networks include at least one of a public analog network, a public ISDN network, and public IP network.

10. A non-transitory computer-readable storage medium storing a program for a gateway device that relays between a first communication network and a plurality of communication devices or/and second communication networks, the gateway device comprising:
 a memory storing instructions; and
 at least one processor configured to process the instructions to implement: a plurality of control units that correspond to the plurality of communication devices or/and second communication networks;
 a data analysis and management unit that corresponds to the first communication network,
 wherein the program: causes the plurality of control units to respectively
  notify the data analysis and management unit of first data received from the plurality of communication devices or/and second communication networks and
  notify the plurality of communication devices or/and second communication networks of second data received from the data analysis and management unit; and
 causes the data analysis and management unit to
  analyze data received from the first communication network and
  notify a control unit included in the plurality of control units of a first result of the analysis as the second data, the control unit being related to the first result of the analysis,
  analyze the first data received from the plurality of control units respectively and
  notify the first communication network of a second result of the analysis, and
  generate a plurality of local Media Access Control (MAC) addresses from a MAC address given to the gateway device and
  assign the plurality of local MAC addresses to the plurality of control units respectively,
 wherein each of plurality of local MAC addresses are generated by:
  setting the local MAC address equal to the MAC address of the gateway device; and
  subsequent to the setting:
   changing a second bit of the local MAC address to a value of one, wherein the second bit indicates that the local MAC address is a local MAC address type when having a value of one, and wherein the second bit is in a first octet in the local MAC address, and
   changing a third octet of the local MAC address to a channel number of a respective one of the plurality of control units, and
 wherein the data analysis and management unit assigns each of the plurality of local MAC addresses to each of the plurality of control units corresponding to the channel number and controls communication between the first communication network and the plurality of communication devices or/and second communication networks based on the plurality of local MAC addresses.

11. The non-transitory computer-readable storage medium according to claim 10,
 wherein the program further causes the data analysis and management unit to generate a management table connecting the channel number associated with each of the plurality of control units, an equipment number for identifying the plurality of communication devices or/and second communication networks, the plurality of local MAC addresses, and classifications of the plurality of communication devices or/and second communication networks.

12. The non-transitory computer-readable storage medium according to claim 11, wherein the plurality of communication devices includes at least one of an analog telephone set and a digital telephone set, and the second communication networks include at least one of a public analog network, a public ISDN network, and public IP network.

* * * * *